United States Patent
Consoli

(10) Patent No.: US 8,511,622 B2
(45) Date of Patent: Aug. 20, 2013

(54) METHOD AND DEVICE FOR DETECTING THE DERAILMENT OF A GUIDED VEHICLE

(75) Inventor: Luciano Consoli, Paris (FR)

(73) Assignee: Siemens S.A.S., St. Denis (FR)

(*) Notice: Subject to any disclaimer, the term of this patent is extended or adjusted under 35 U.S.C. 154(b) by 23 days.

(21) Appl. No.: 13/387,857

(22) PCT Filed: Oct. 21, 2009

(86) PCT No.: PCT/EP2009/063828
§ 371 (c)(1),
(2), (4) Date: Jan. 30, 2012

(87) PCT Pub. No.: WO2011/012176
PCT Pub. Date: Feb. 3, 2011

(65) Prior Publication Data
US 2012/0126066 A1 May 24, 2012

(30) Foreign Application Priority Data
Jul. 28, 2009 (EP) .................................... 09290596

(51) Int. Cl.
*B61L 3/00* (2006.01)
(52) U.S. Cl.
USPC ....... 246/170; 246/167; 105/72.2; 105/215.1; 105/215.2
(58) Field of Classification Search
USPC ........ 246/167, 170, 171, 172, 173; 105/72.2, 105/215.1, 215.2
See application file for complete search history.

(56) References Cited

U.S. PATENT DOCUMENTS

| | | | | |
|---|---|---|---|---|
| 3,180,280 A | * | 4/1965 | Kuch et al. | 104/245 |
| 4,783,028 A | | 11/1988 | Olson | |
| 5,704,295 A | * | 1/1998 | Lohr | 105/72.2 |
| 5,758,583 A | * | 6/1998 | Lohr | 105/72.2 |
| 5,960,717 A | * | 10/1999 | Andre | 104/139 |
| 6,029,579 A | * | 2/2000 | Andre et al. | 105/72.2 |
| 6,363,860 B1 | * | 4/2002 | Andre | 105/72.2 |
| 7,228,803 B2 | * | 6/2007 | Andre et al. | 104/244 |
| 7,891,303 B2 | * | 2/2011 | Dupont et al. | 105/215.1 |
| 8,141,496 B2 | * | 3/2012 | Andre | 105/72.2 |
| 2006/0122745 A1 | | 6/2006 | Lueger et al. | |
| 2010/0065692 A1 | * | 3/2010 | Andre | 246/121 |
| 2012/0126066 A1 | * | 5/2012 | Consoli | 246/170 |

FOREIGN PATENT DOCUMENTS

| | | |
|---|---|---|
| CN | 1730335 A | 2/2006 |
| DE | 102794 C | 6/1989 |
| FR | 2455538 A1 | 11/1980 |
| RU | 2235031 C1 | 8/2004 |
| WO | 0164494 A1 | 9/2001 |
| WO | 2008074942 A1 | 6/2008 |

\* cited by examiner

*Primary Examiner* — Jason C Smith
(74) *Attorney, Agent, or Firm* — Laurence A. Greenberg; Werner H. Stemer; Ralph E. Locher

(57) ABSTRACT

A vehicle that is guided by a guiding system is monitored for derailment. The guiding system has a guiding member interacting with a railhead of a rail that guides the vehicle. The device includes a clamp with a bottom jaw tightly surrounding the railhead in a contactless manner in the closed position thereof, capable of opening the jaw when interaction is lost between the guiding member and the rail. The opening results when the railhead at least partially exits the jaw. A top rod of the clamp enables mechanical transmission of the opening of the jaw to a switch. The switch has a nominal configuration corresponding to the closed position of the clamp during correct re-railing and an alarm configuration generated by mechanical transmission of the opening of the jaw to the switch. The alarm configuration actuates a safety system of the guided vehicle.

14 Claims, 2 Drawing Sheets

METHOD AND DEVICE FOR DETECTING THE DERAILMENT OF A GUIDED VEHICLE

BACKGROUND OF THE INVENTION

Field of the Invention

This invention relates to a method and a device for the real-time detection of the derailment of a vehicle guided by a guidance system comprising a guide member interacting with a rail used to guide the vehicle.

"Guided vehicle" refers to public transport means such as buses, trolleybuses, streetcars, subways, trains or train units, etc., as well as load transporting means such as, for example, overhead travelling cranes, for which safety is a very important factor and which are guided specifically by a single rail. This latter is used to guide the guide member, which usually bears against the rail and follows its trajectory during vehicle movement. The guide member enables, for example, the guidance system to direct a steering axle of the vehicle along the trajectory defined by the rail, said axle being, for example, provided with load-bearing wheels.

A first known variant of the guide member includes a pair of guide wheels, also known as guide rollers, arranged in a V shape and rolling on said guide rail. This system of wheels arranged in a V shape is in particular used by road vehicles moving along the guide rail. The rollers in question may be the flanged type described in U.S. Pat. No. 7,228,803 B2 or protected by a separation protection system as disclosed in document WO 2008/074942 A1. The general operating principle of vehicles guided by this type of guide member is that said guide member follows the rail using a pair of rollers in contact with the rail and provides the guidance system with a direction to be imposed on the steering axle of the vehicle. The guide rail comprises in particular a base plate attached to the ground and a web supporting a railhead against which the rollers bear via a running surface. The running surface of each of the rollers in a single pair of guide rollers is therefore in contact with a surface of the railhead, known as the rail surface and distributed symmetrically on either side of the upper part of the railhead. As the vehicle moves, the rollers are in contact with the railhead, and the respective flanges thereof surround this latter and approach the web beneath it. As the distance between the lower ends of the two flanges surrounding the railhead is less than the width of the railhead, the removal of the railhead from the grip of said rollers, or from the zone between the running surfaces and the flanges, is only possible if the roller attachment angle, i.e. the angle corresponding to the sector formed by the axes of rotation of each of the rollers in a pair of rollers which is intersected by the plane of symmetry of the pair of rollers arranged in a V shape, increases and/or if the flanges and/or the outer edges of the railhead are deformed.

The correct orientation of the vehicle is therefore obtained by coupling the pair of rollers in the guide member of the guidance system with the steering axle of the vehicle. If the rollers are correctly fitted around the guide rail, the vehicle follows the trajectory described by the rail when in movement. Conversely, if the rollers are not in their normal operating position, for example if the railhead of the guide rail moves outside the zone between the running surfaces and the flanges, the vehicle risks leaving the trajectory initially established by the rail. Indeed, once the rollers are no longer subject to the direction imposed by the guide rail, they can move to the right or left of the rail, thereby deviating the vehicle from the anticipated trajectory. This scenario is described as a loss of vehicle guidance. In other words, the correct position of the rollers is a necessary—but not in itself sufficient—condition to guarantee the correct direction of the vehicle. Indeed, other faults may occur, such as the breaking of a steering rod, which may also result in derailment.

A second variant of the guide member is described in document WO 2008/074942 A1, comprising a pair of rollers closely fitting a railhead, as described above, with the difference that the rollers do not have flanges. In this case, the wheel flanges are replaced by flanges rigidly connected to a mounting base of the rollers. This configuration provides greater rigidity, which increases the force required to separate the rollers from the rail.

A third variant involves a guide member comprising at least one grooved wheel, i.e. a wheel characterized by a hollow part enabling it to run on different tracks or to be used with a rope. The grooved wheel is supported vertically on the rail and includes—among other things—flanges overlapping both sides of the railhead.

Regardless of the variant of the guide member considered, it is possible for the railhead to move outside the grip of the rollers and, consequently, loss of vehicle guidance is a risk to be taken into consideration in order to prevent, in the event of a derailment, material damage or personal injury, with particular regard to the safety of passengers in the case of public transport. Furthermore, some countries have established rules regarding the construction and development of public transport means that require the safety of the transport means to be taken into consideration. This is the case for tramway construction standards established by federal German law and entitled "Verordnung über den Bau and Betrieb der Strassenbahnen" (see Internet link http://bundesrecht.juris.de/strabbo 1987/index.html), which require automatic vehicle derailment detection. For this purpose, systems for detecting the loss of guidance of guided vehicles are used in rail guidance, in particular for railway vehicles, and they usually enable safety procedures to be triggered.

A first detection system is described in U.S. Pat. No. 4,783,028. It comprises a hydropneumatic system for identifying the rolling angle of a vehicle axle. The system in question is able to identify the instant at which a wheel derails and then to command a purge of the chambers in a braking system, which causes the brake calipers to apply the braking forces. Unfortunately, such systems require specifically designed control valves, and may suffer hydraulic and pneumatic leaks. They also include numerous components susceptible to failure: accumulators and reservoirs, pressurized lines, pressure gauges, safety valves, accessories required for pressurization, etc.

A second system is based on detecting variations in roller acceleration. This system is based on the principle that once a wheel has derailed, the accelerations caused exceed a given threshold and trigger a safety system. This identification of variations in acceleration may be based on an electronic system, such as the one described in document US 2006/0122745 A1, or a pneumatic system such as the one described in document CN 1730335A. This detection method requires a sensor measurement of acceleration, followed by processing and analysis of the information acquired by the sensor. Such methods usually suffer from failures and incorrect readings. To overcome these shortcomings, systems with very high reliability that are expensive and require complex development are required.

A third detection system is based on contactless detection methods. These methods may in principle be optical, for example a light beam between an emitter and a receiver that is detected as soon as the wheel moves away from its normal rail position, as described in document WO 01/64494 A1, or use magneto-dynamic, acoustic or other sensors that identify derailment, as disclosed for example in document RU2235031-C1. Contactless detection methods are usually sensitive to the restrictive environment typical of outdoor wheel-rail systems, including, for example, dust accumulation, fouling, vibration, electromagnetic disturbances and climatic variations, such as temperature variations (−33° C. to 50° C.), variations in humidity, or ice formation. This restrictive environment requires frequent maintenance of the detection system, and for systems to be designed with a high rate of reliability in order to prevent false alarms, again generating high costs, either for the maintenance or development of such systems, for example.

A fourth detection system is based on the transmission of a signal through the rail. The principle involves the use of a signal emitter linked to a guide wheel and a receiver in another wheel. As long as both wheels are in contact with the rail, a signal is sent from the emitter to the receiver. If one of the two wheels loses contact with the rail, transmission of the signal is broken, which triggers a safety system in the guided vehicle, as described for example in document WO 2008/074942 A1. Again, such systems are relatively complex and require the signal to be processed and analyzed in order to prevent false alarms and interference from other signals.

As shown above, the detection systems implemented to date are complex and costly, generally involving numerous components, each one liable to cause a fault or a false derailment alarm. Indeed, the complexity of these systems formed by numerous components is liable to cause numerous faults, related for example to hydraulic or pneumatic leaks, incorrect processing or interpreting of signals, or the restrictive outdoor environment which may alter the signals received by a sensor.

BRIEF SUMMARY OF THE INVENTION

An object of the present invention is to propose a method and a device that is simple, strong, rapid, safe and reliable for detecting the derailment of a vehicle guided by a guide rail.

Another object of the present invention is to propose a detection device that is cheap to develop, manufacture, implement and maintain as it uses components that are simple to implement and maintain.

To achieve these objects, a device and a method are proposed by the content of the claims.

A set of sub-claims also sets out the advantages of the invention.

On the basis of a derailment detection method designed for a vehicle guided by a guidance system comprising at least one guide member interacting with a railhead guiding the guided vehicle, in particular, the guide member being in mechanical contact with said railhead, said guide member possibly comprising, for example, a pair of flanged wheels arranged in a V shape or a grooved wheel bearing against the railhead, the method according to the invention is characterized in that it comprises the following steps:

The opening of a bottom jaw of a clamp that, in closed position, closely and contactlessly surrounds the railhead, said opening being caused by an at least partial movement of said railhead outside said jaw in the event of a loss of interaction between the guide member and the railhead, said loss of interaction being for example the loss of mechanical contact between a wheel of the guide member and the rail, or the loss of contact in at least one of the two wheels forming said pair of wheels arranged in a V shape, The mechanical transmission of the opening of the jaw, in particular via at least one top rod of the clamp to at least one switch having two configurations: a nominal configuration corresponding to the closed position of the clamp when rail position is correct, and a warning configuration caused by the mechanical transmission of the opening of the jaw to the switch, The actuation by the switch of at least one safety system of the guided vehicle if the switch is in warning configuration.

On the basis of a derailment detection device designed for a vehicle guided by a guidance system comprising at least one guide member interacting with a railhead guiding the guided vehicle, in particular, said interaction comprising the mechanical contact of the guide member with the railhead of the guide rail of the guided vehicle, said guide member possibly comprising, for example, a pair of flanged wheels or a grooved wheel bearing against the railhead, the device according to the invention is characterized in that it comprises:

a clamp including a bottom jaw that is intended, in closed position, to closely and contactlessly surround the railhead, and that opens as a result of an opening of the jaw thereof in the event of a loss of interaction between the guide member and the railhead, said loss of interaction being for example a loss of mechanical contact between one or more wheels of the guide member and the railhead, and said opening being caused by said railhead moving at least partially outside said jaw, at least one top rod of the clamp enabling the opening of the jaw to be transmitted mechanically to at least one switch, said switch having two configurations, a nominal configuration corresponding to the closed position of the clamp when rail position is correct, and a warning configuration caused by the mechanical transmission of the opening of the jaw to the switch, said warning configuration being able to actuate at least one safety system of the guided vehicle.

The term "switch" used above refers to a physical device characterized by two configurations, a first configuration enabling a flow, and a second configuration enabling said flow to be stopped. In this case, it is for example an electrical switch, the nominal configuration of which opens an electrical circuit, and the warning configuration closes said circuit, such that the current flow is respectively blocked or transmitted through said switch. Evidently, the operation of the switch may be inverted, such that the circuit is closed in nominal configuration and opened in warning configuration. Another example switch according to the invention is a hydraulic or pneumatic valve having said two configurations that enable for example the connection or disconnection of a primary hydraulic (or pneumatic) circuit from a secondary hydraulic (or pneumatic) circuit. In this case, said valve may in particular order a purge of the chambers of a braking system.

In particular, the detection method according to the invention is characterized in that said clamp is attached to a supporting element rigidly connected to a supporting element of the guide member of the guide system. In other words, if the guide member has one or more wheels, said clamp is for example attached to a supporting element rigidly connected to a supporting element of the wheel or wheels. The fact that, in the detection device according to the invention, said clamp is attached to a supporting element rigidly connected to a supporting element of the guide member means that any movement of the guide member away from the rail, such as in the event of a derailment, results in the railhead moving totally or partially outside the grip of the clamp jaw. Furthermore, the attachment of the clamp to the supporting element of the guide member makes said detection device adaptable to all guide members. Indeed, said clamp need only be positioned close to a zone of interaction between the rail and the guide member for derailments to be detected safely and reliably by the detection device according to the invention.

Advantageously, said clamp is positioned downstream or upstream of said guide member in relation to the direction of movement of the guided vehicle. The terms "downstream" and "upstream" refer respectively to the position of the clamp in front of or behind said guide member, in relation to the direction of movement of the vehicle. For example, this could mean positioning said clamp above the rail in a plane perpendicular or nearly perpendicular to the rail along its length, at a distance of about one half radius of a roller forming said pair of rollers arranged in a V shape, downstream or upstream of the center of said pair of rollers arranged in a V shape, in relation to the direction of movement of the guided vehicle.

Furthermore, the detection method according to the invention is characterized in that said mechanical transmission of the opening of the jaw is effected by two top rods of the clamp. Said top rods are or form, for example, an extension above the rail of two bottom arms of the clamp, said arms forming said jaw, with one of the two arms being on one side of the railhead and the other of the two arms facing it on the other side of the railhead such that said arms form said jaw and closely surround said railhead in said plane perpendicular or nearly perpendicular to the rail. Consequently, the top rods each extend one arm of the jaw, either by crossing at a pivot point, i.e. in a scissor configuration, or without crossing at said pivot point. Consequently, a gap between the free ends of the top rods and their initial position, determined when the clamp is in the closed position, is directly related to the opening of said jaw. Therefore, using the distance between the free ends of the rods when the clamp is closed as a reference, a positive gap characterizes a clamp with crossed rods, i.e. when the clamp is opened, the free ends of the rods move away from one another, and a negative gap characterizes rods that are not crossed, i.e. when the clamp is opened, the free ends of the rods move towards one another.

The free end of each top rod of the clamp is either in contact, or near contact with at least one switch, such as to effect said mechanical transmission of the opening of the jaw in accordance with the detection device according to the invention. Near contact refers to a position of the upper end of the top rod, i.e. its free end is close to the switch, but not touching it. In a specific case, said mechanical transmission of the opening of the jaw may be effected by means of a cable linking at least one of the top rods to the switch, the movement of the other rod being restricted for example, such that a relative movement of at least one of the rods actuates said switch by means of said cable using a principle similar to cable brake systems currently used on bicycles.

In a specific embodiment, the opening of the jaw can be transmitted to at least two switches, the free end of one of said top rods being able to actuate each one of the switches, for example. In this case, each of the top rods of the clamp is able to mechanically transmit the opening of the jaw to a switch. In another embodiment, both switches are actuated for example by two different positions of a single top rod. In all cases, said actuation of the safety system is caused by at least one of said two switches switching from a nominal configuration to a warning configuration, said switching being caused by the mechanical transmission of the opening of the jaw. Advantageously, said switches are independent of one another and each one is able to maintain said warning configuration after the jaw has opened.

Indeed, when the jaw opening is mechanically transmitted to said switch, the free end of the top rod actuates the switch, exerting pressure on a pushbutton of said switch, for example. Consequently, even if the jaw of the clamp recloses and the free end of the top rod stops actuating the pushbutton of said switch, this latter remains in warning configuration, for example by keeping said pushbutton in a position such that it is always depressed by said free end of the top rod.

Thus, the detection method according to the invention is advantageously characterized by the switch being kept in warning configuration after the jaw has opened. Indeed, once the jaw has opened to release the railhead from the grip thereof, regardless of the time the jaw is open, and even if it has returned to a closed position by means of a spring system following removal of the railhead from the grip thereof, the switch, once actuated, retains a warning configuration which notably enables actuation of the safety system that, for example, commands the vehicle to stop or warns the driver or a central control station of the derailment before the vehicle deviates completely from the trajectory defined by the rail.

Moreover, the detection method according to the invention is in particular characterized in that said opening of the jaw of the clamp is triggered by an at least partial movement of said railhead outside said jaw, in particular in the event of a loss of mechanical contact of at least one of the wheels of a guide member of a guidance system comprising at least two wheels closely fitting the rail. Consequently, firstly, even if the railhead does not move entirely outside the grip of the clamp, this latter is able to send a variation in the jaw opening so that the derailment is detected and signaled, and secondly, a loss of mechanical contact of at least one wheel of the guide member, for example a grooved wheel, or at least one of the wheels of a pair of wheels arranged in a V shape of said guide member, causes the derailment to be detected. Indeed, given that the jaw of the clamp surrounds the railhead closely but contactlessly, any loss of contact in at least one wheel of the guide member results in a change of the position of the clamp in relation to the railhead, notably a change of position along a vertical axis, which causes a change in the jaw opening and therefore the mechanical transmission of said variation to the switch, which is able to trigger the derailment warning by actuating the safety system. In other words, the detection device according to the invention is advantageously characterized in that said clamp is able to open in the event of a loss of mechanical contact in at least one of the wheels of a guide member of a guidance system, if said guide member comprises at least two wheels closely fitting the rail.

Finally, exemplary embodiments and applications are provided by:

DESCRIPTION OF THE INVENTION

Figure 1:
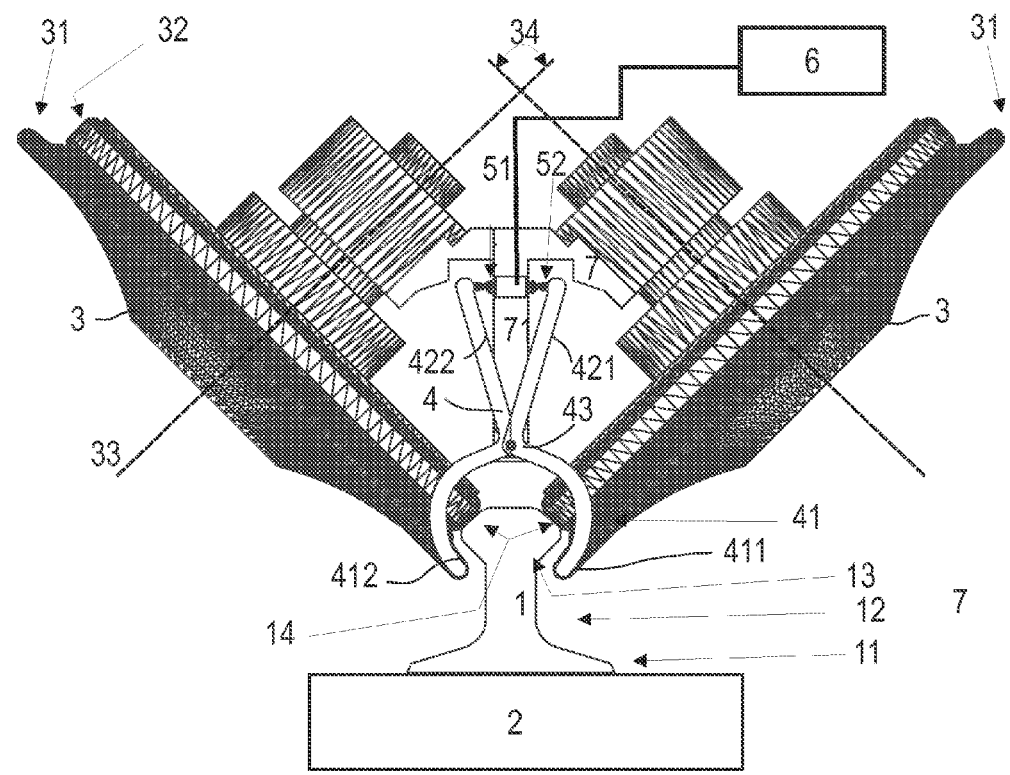
FIG. 1 Exemplary embodiment according to the invention of a derailment detection device designed for a vehicle guided by a guidance system comprising a pair of rollers arranged in a V shape.

By way of example, FIG. 1 shows a derailment detection device designed for a vehicle guided by a guidance system comprising a guide member bearing against a rail 1 attached to the ground 2. The rail comprises a base plate 11 surmounted by a web 12 supporting a railhead 13. Said guide member comprises in particular a pair of rollers 3 arranged in a V shape that closely fit the railhead 13 of the guide rail 1. The rollers 3 include, among other things, a protruding part known as a flange 31 intended to improve the rolling and guidance conditions of the guidance system, a running surface 32, and an axis of rotation 33. The axes of rotation 33 of the rollers of a pair of rollers define an angle known as the attachment angle 34. Each of the rollers 3 bears, via the running surface 32 thereof, against the railhead 13 of the guide rail 1, thereby defining a roller-rail contact zone known as the rail surface 14, that is distributed, in the specific case of the guide member comprising a pair of rollers 3 arranged in a V shape, on each side of the upper part of the railhead 13.

A clamp 4 comprising a bottom jaw 41 that, when in closed position, closely and contactlessly surrounds the railhead 13 of the rail 1 can be opened by opening the jaw 41 thereof in the event of a loss of mechanical contact between said rollers 3 and the rail 1, said opening being caused by said railhead 13 moving outside the jaw 41. Specifically, it is sufficient for one of the two rollers 3 in the pair of rollers to cease to be in contact with said rail 1 for the clamp 4 to open through the opening of the jaw 41 thereof. The jaw 41 is formed for example by two arms 411, 412 on either side of the railhead 13, the shape of which allows them to surround the railhead 13 to the upper part of the web 12. The opening of the jaw 41 corresponds to the relative gap between one of said arms 411 and the other of said arms 412. Furthermore, the clamp 4 includes at least one top rod 421, 422 enabling the gap of the jaw 41 to be transmitted mechanically to at least one switch 51, 52. Advantageously, each of the arms 411, 412 of the jaw 41 extends above the rail in a top rod 421, 422 that enables each one to trigger its own switch 51, 52 independently of the other. Consequently, two independent switches 51, 52 can each be actuated by one of the top rods 421, 422, for example. Thus, the opening of the jaw 41 is transmitted mechanically by at least one of the upper ends of the top rods 421, 422, in particular by the top rod whose jaw arm is moved when the railhead moves outside the grip of said jaw. According to a first variant not shown, the jaw arm and the corresponding top rod are on either side of the rail in a scissor configuration, and according to a second variant, as shown in FIG. 1, the jaw arm and the corresponding top rod are on the same side of the rail. In the first variant, the top rod actuates the switch by traction, while in the second variant, the switch is actuated by pressure. The traction or the pressure act on a pushbutton of the switch, for example. In the second variant, the top rods are in particular nearly in contact (short distance between the end of the top rod and the switch) or in direct contact with the switch or the pushbutton thereof.

Moreover, the pushbuttons of said switches 51, 52 are characterized notably by two positions: a first position corresponding to the nominal configuration of the switch, i.e. the closed position of the clamp when rail position is correct, and a second position corresponding to the warning configuration of the switch resulting from the mechanical transmission of the opening of the jaw 41 by at least one of the two top rods 421, 422 to at least one of said switches 51, 52, said second position enabling the actuation of at least one safety system 6 of the guided vehicle.

The clamp 4 is attached using an attachment system 43 to a supporting element 71 rigidly connected to a supporting element 7 of the rollers 3 which is used in particular as a mounting base for said rollers 3. In particular, the attachment system 43 coincides with a joint of the clamp. Furthermore, the attachment system 43 may advantageously be provided with a spring system that returns the clamp 4 to a closed position when the jaw 41 is not subject to any force by the railhead 13, in particular when rail position is correct. Furthermore, the attachment system 43 is dimensioned to withstand stresses generated by acceleration of the guidance system without falsely triggering the switch 51, 52. The shape and size of the jaw 41 also enable wear of the roller-rail contact zone to be taken into account, notably the wear of the running surfaces 32 and rail surfaces 14 of the railhead 13. For this purpose, the shape of the jaw enables the clamp to approach said railhead along a vertical axis, in particular leaving a space between the top of the railhead and the bottom of the jaw, such that the arms of the jaw do not touch the railhead if the rail and/or rollers are worn.

Figure 2:
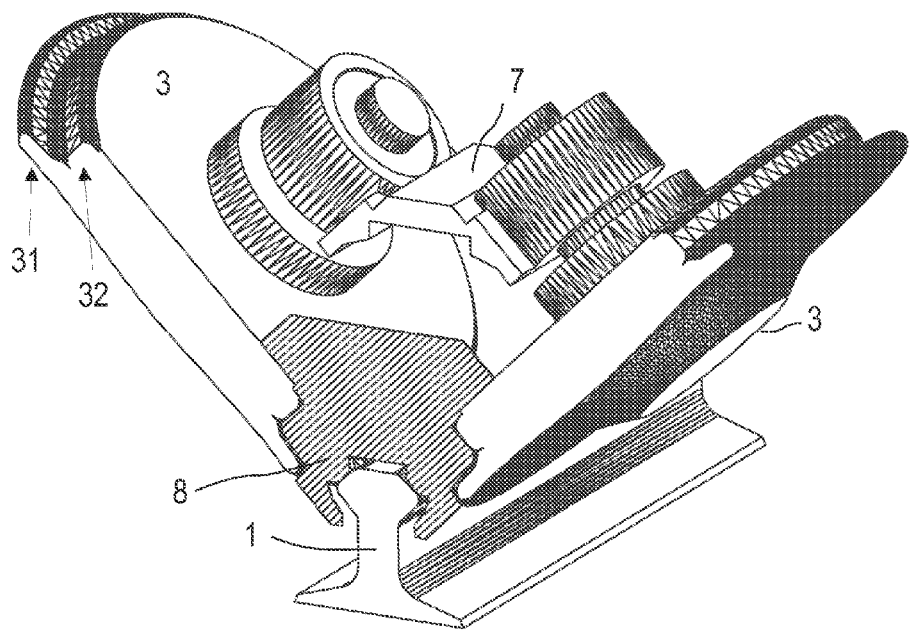
FIG. 2 Example according to the invention of the zone available for installation of a part of the derailment detection device in the case of a guidance system comprising a pair of rollers arranged in a V shape.

This invention also takes into account the size of the clamp between the rollers and the rail. Indeed, the space available for the clamp depends on the horizontal position thereof in relation to the center of the rollers. The movement of the clamp, in a plane nearly perpendicular to the rail along the length thereof, towards or away from the center of the rollers, respectively reduces or increases the space available for installation of the clamp and the curve clearance of the guide rail. Indeed, the closer the jaw of the clamp is to the roller-rail contact zone, the less the opening thereof interferes with a curved trajectory of the rail, i.e. with the curve clearance thereof. In particular, an example compromise between the space available for the clamp and the interference with the curve clearance of the rail can be achieved by placing the clamp at a distance of approximately one half roller radius from the center of the rollers in a zone 8 of the plane nearly perpendicular to the rail, as shown in FIG. 2, using the same references as in FIG. 1.

Figure 3:
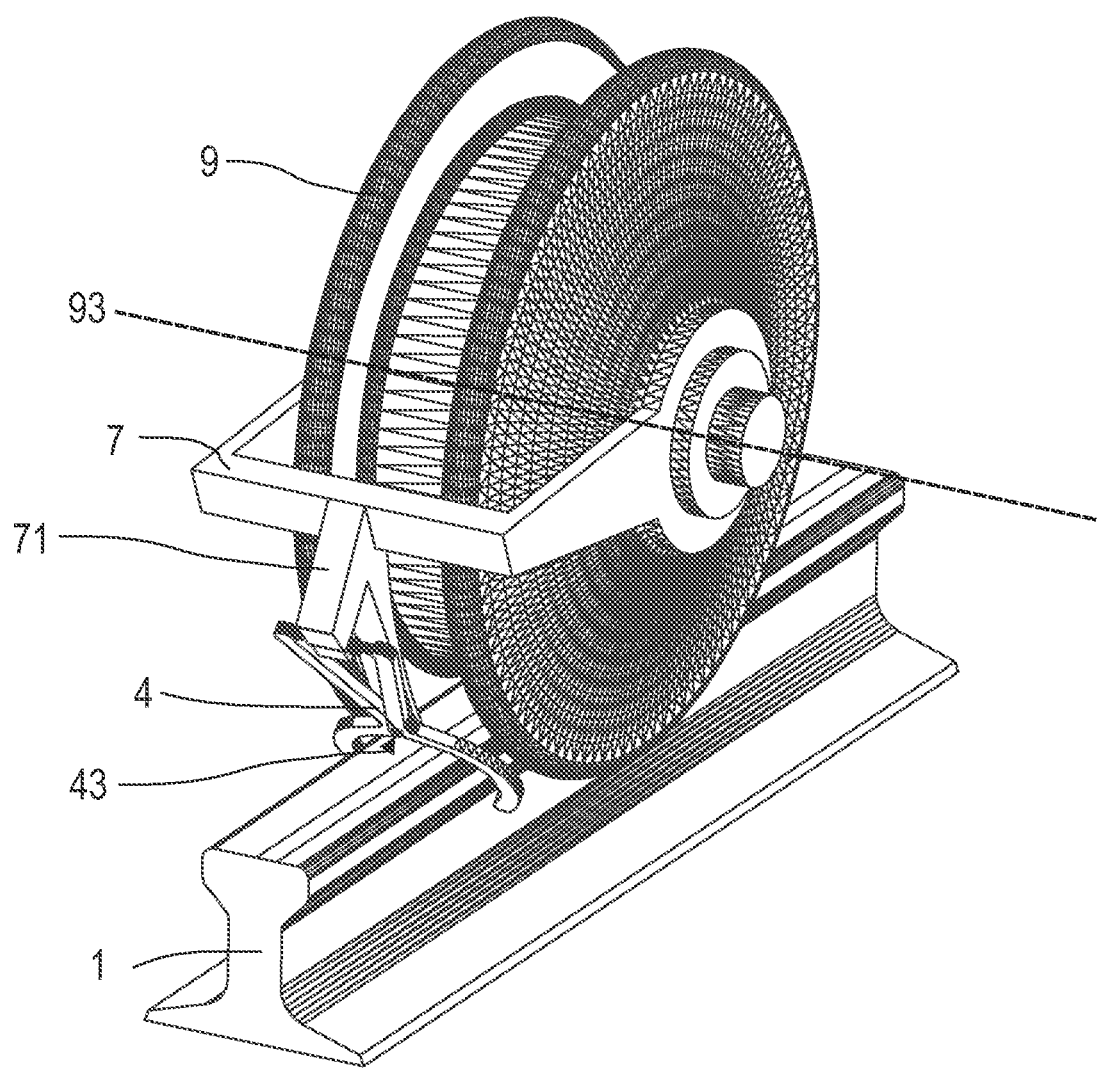
FIG. 3 Exemplary embodiment according to the invention of a derailment detection device designed for a vehicle guided by a guidance system comprising a grooved wheel bearing against a rail.

In another variant of said guide member, the pair of rollers 3 arranged in a V shape is replaced by a grooved wheel 9 bearing against the guide rail 1 as shown in FIG. 3.

In this case, the clamp 4, as described above, is placed upstream or downstream of said grooved wheel 9, which is attached using an attachment system 43 to a supporting element 71 rigidly connected to a supporting element 7 of said grooved wheel 9, which is used notably as a mounting base for said grooved wheel. In particular, said clamp 4 is in a plane inclined in relation to the plane formed by the axis of rotation 93 of said grooved wheel and a straight vertical line perpendicular to the rail intersecting said axis of rotation. The incline of said clamp enables the jaw of the clamp to be moved as close as possible to the contact zone between the grooved wheel and the rail. Advantageously, said incline of the clamp may be used similarly for a pair of rollers arranged in a V shape, as shown in FIG. 1, to get as close as possible to the contact zone between the rollers and the rail.

If at least one roller of the guide member becomes separated from the rail, regardless of the type of guide member, i.e. regardless of whether it includes for example a pair of rollers arranged in a V shape or a grooved wheel, the lower part of the jaw 41 of the clamp 4 touches the lower part of the railhead 13. As the gap between the lower ends of the arms 411, 412 forming the jaw is less than the width of the railhead 13, the jaw opens as a result of contact of the lower parts of the railhead with the lower ends of the arms 411, 412 forming the jaw, in the event of separation of at least one roller 3 from the rail 1. Thus, the maximum opening of the jaw 41 of the clamp corresponds, in the event of a derailment along a vertical axis perpendicular to the rail, to the maximum width of the railhead.

If the clamp 4 is in closed position, the upper ends of the top rods 421, 422, i.e. the free ends, do nothing to the respective switches 51, 52 thereof; no mechanical force is transmitted by the top rod to the switch. However, in the event of said separation, the opening of the jaw results in the upper ends of the top rods 421, 422 moving closer to one another. This movement causes at least one and possibly both of the switches to be actuated, switching from the nominal configuration to the warning configuration thereof. Indeed, when the jaw 41 opens, at least one of the top rods moves and actuates for example the pushbutton of the switch that it is able to touch. The movement of the upper end of each of the top rods between a first position characterizing the jaw when closed, and a second position characterizing the jaw when open, is proportional to the movement of the pushbutton of the switch between a first position thereof (nominal configuration) and a second position thereof (warning configuration), and to said gap of the lower ends of two arms forming the jaw, said gap corresponding to the difference in distance between the ends of the jaw when this latter is open or closed. It should be noted that the jaw is said to be closed when it closely surrounds the railhead, and therefore, although the term "closed" is used, there is a space between the two free ends of the arms of the jaw, between which the base of the railhead is located.

Furthermore, at least one of the two switches is in particular able to retain its warning configuration once the opening of the jaw has been transmitted to it mechanically. The warning configuration makes it possible to actuate the safety system 6 of the vehicle, either by sending a signal to the systems in charge of safety, or by cutting a signal. In particular, cutting said signal triggers said systems in charge of safety. The system in charge of safety may for example activate an emergency brake, or send a warning signal to the driver of the guided vehicle or to a central control station. In particular, said two switches may be replaced by a single switch with two pushbuttons, each of the pushbuttons being linked to one of the two top rods, which can actuate it. In this case, the switch is able to keep its warning position once one of the two pushbuttons has been actuated by the top rod touching it. The actuation of two pushbuttons or, in the case of two distinct and independent switches, two switches creates redundancy and increases the reliability of the detection system.

Keeping the switch in the warning configuration means that the safety system 6 is actuated by said switch even if the time the railhead is outside the grip of the jaw is extremely short, in which case the jaw returns to a closed position a fraction of a second after the derailment, said closed position causing a relaxation of the mechanical force previously transmitted by the top rod to the switch.

Finally, such a detection system based on the opening of a jaw of a clamp and the mechanical transmission of this opening to a switch is adaptable to any guide member, interacting with the rail, either by contact, as in the case of a wheel bearing against the railhead, or by means of interactions without direct contact with the rail. Indeed, it is sufficient for said rail to include a railhead-shaped part for the system to be adaptable to the guidance system by attachment to a supporting element rigidly connected to a supporting element of said guide member. In particular, the detection device is advantageously adaptable to guide members comprising two wheels assembled in a V shape bearing against the railhead, but also to guide members comprising a single wheel, in particular in the case of grooved wheels, as shown in FIG. 3.

In summary, the method and the device according to the invention make it possible to identify the derailment of the guided vehicle safely, reliably and in real-time, while providing advantages over existing methods and devices. Indeed, the simplicity of the device based on an electromechanical logic system with a single control device, the switch, makes it more reliable than existing systems. The notable advantages over existing systems are as follows:

Fewer components liable to fail, resulting in particular in low development, manufacturing, installation and maintenance costs, Operation requires no analysis or processing of signals or information: only the binary configuration of the switch (nominal configuration, warning configuration) determines the actuation of the safety system, without any data processing being required, Clamp operates without any hydropneumatic components, Device easy to implement and maintain: the simplicity of the device means that it needs little maintenance, Withstands restrictive outdoor environments related to guided vehicles, The jaw does not touch the rail when closed, ensuring limited wear of the detection device, Design requires no signal filtering to detect loss of guidance or an actual problem.

The invention claimed is:

1. A derailment detection method for a vehicle that is guided by a guidance system including at least one guide member interacting with a railhead of a rail for guiding the vehicle, the method comprising:

providing a clamp with a bottom jaw that, in a closed position, closely and contactlessly surrounds the railhead of the rail;

opening the bottom jaw of the clamp, the opening being caused by an at least partial movement of the railhead to outside the jaw in an event of a loss of interaction between the guide member and the railhead of the rail;

providing at least one switch with two configurations including a nominal configuration and a warning configuration;

mechanically transmitting the opening of the jaw to the at least one switch, wherein the nominal configuration of the switch corresponds to the closed position of the clamp when a rail position is correct, and the warning configuration is caused by the mechanical transmission of the opening of the jaw to the switch; and when the switch is in the warning configuration, actuating at least one safety system of the guided vehicle with the switch.

2. The detection method according to claim 1, wherein said clamp is attached to a supporting element rigidly connected to a supporting element of the guide member.

3. The detection method according to claim 1, wherein the clamp is positioned downstream of the guide member relative to a direction of movement of the guided vehicle.

4. The detection method according to claim 1, which comprises effecting the mechanical transmission of the opening of the jaw by two top rods of the clamp, wherein a gap between the free ends of the top rods is directly correlated with to the opening of the jaw.

5. The detection method according to claim 1, which comprises holding the switch in warning configuration after the jaw has opened.

6. The detection method according to claim 1, which comprises triggering the opening of the jaw of the clamp with an at least partial movement of the railhead outside the jaw in the event of a loss of mechanical contact of at least one of the wheels of a guide member of a guidance system having at least two wheels closely fitting the rail.

7. The detection method according to claim 1, wherein the transmitting step comprises transmitting the opening of the jaw to at least two switches and which comprises causing an actuation of the safety system by at least one of the two switches switching from a nominal configuration to a warning configuration.

8. A derailment detection device for a vehicle guided by a guidance system having at least one guide member interacting with a railhead of a rail used to guide the vehicle, the detection device comprising:
- a clamp having a bottom jaw configured, in a closed position of said clamp, to closely and contactlessly surround the railhead of the rail, and wherein said jaw is configured to open in the event of a loss of interaction between the guide member and the railhead of the rail, with the opening being caused by a complete or partial movement of the railhead out of said jaw;
- at least one switch having two configurations including a nominal configuration representing a closed position of said clamp when a rail position is correct, and a warning configuration;
- said clamp having at least one top rod enabling the opening of said jaw to be mechanically transmitted to said at least one switch, wherein a mechanical transmission of the opening of said jaw to said switch is configured to cause said switch to assume the warning configuration in which said switch actuates at least one safety system of the guided vehicle.

9. The detection device according to claim 8, wherein said clamp is attached to a supporting element rigidly connected to a supporting element of the guide member.

10. The detection device according to claim 8, wherein said clamp is positioned downstream of the guide member relative to a direction of movement of the guided vehicle.

11. The detection device according to claim 8, wherein said clamp includes two top rods and the mechanical transmission of the opening of said jaw is effected by said two stop rods, with a gap between the free ends of said top rods being directly correlated with the opening of said jaw.

12. The detection device according to claim 8, wherein said switch is capable of maintaining the warning configuration after said jaw has opened.

13. The detection device according to claim 8, wherein said clamp is configured to open in the event of a loss of mechanical contact of at least one of the wheels of a guide member of a guidance system, with said guide member comprising at least two wheels closely fitting the rail.

14. The detection device according to claim 8, wherein said at least one switch is one of two mutually independent switches and said clamp includes two top rods each configured to mechanically transmit the opening of said jaw to a respective switch.

* * * * *